Oct. 14, 1947.  S. V. MADDOX  2,429,189
SERVOMOTOR
Filed Aug. 29, 1944  3 Sheets-Sheet 1

Inventor
Stanley Victor Maddox
By Moses, Nolte, Crews & Berry
Attorneys

Oct. 14, 1947.      S. V. MADDOX      2,429,189
SERVOMOTOR
Filed Aug. 29, 1944      3 Sheets-Sheet 2

Inventor
Stanley Victor Maddox
By Moses, Nolte Cromx Berry
Attorneys

Oct. 14, 1947.  S. V. MADDOX  2,429,189
SERVOMOTOR
Filed Aug. 29, 1944  3 Sheets-Sheet 3

Patented Oct. 14, 1947

2,429,189

UNITED STATES PATENT OFFICE 2,429,189

SERVOMOTOR

Stanley Victor Maddox, Cheylesmore, Coventry, England, assignor to H. M. Hobson Limited, London, England Application August 29, 1944, Serial No. 551,706
In Great Britain January 1, 1944

5 Claims. (Cl. 121—38)

This invention relates to hydraulic servomotors of the type in which the servopiston is moved to one or other of two alternative end positions under the control of an operating valve actuated by a pressure-sensitive device.

The operating valve is normally constituted by a piston valve which controls pressure and exhaust connections to the servocylinder to effect movement of the servopiston from its one end position to the other when the load on the pressure-sensitive device exceeds a given limit, and to return the servopiston to its original position when the load on the pressure sensitive device falls below said limit.

The operating valve will, generally speaking, receive insufficient movement from the pressure-sensitive device, when the load on it exceeds or falls below the limit, to provide more than a restricted flow of pressure fluid to and from the servocylinder, so that the servopiston will only be able to travel slowly in the cylinder. It is, however, in many cases desired that the servopiston should travel rapidly from one end of the cylinder to the other, for example when the servomotor is arranged to change the gear ratio of the blower of an aircraft engine under the control of a device sensitive to atmospheric pressure. To accelerate the movement of the piston it has been proposed to introduce between the servocylinder and the operating piston valve a piston-type shuttle valve which follows the movement of the operating piston valve and, when displaced from either of its end positions, is effective to provide an unrestricted flow of pressure fluid to one end of the servocylinder and an unrestricted flow of exhaust fluid from the other end.

The invention provides an hydraulic servomotor of the above type, comprising a pair of conduits communicating respectively with opposite ends of the cylinder and providing restricted flow connections to pressure and exhaust which are reversible by the operating valve, and means controlled by the servopiston, and arranged to be operated thereby, after preliminary slow movement thereof in either direction under the influence of said restricted flow, to establish during a portion at least of the remainder of the stroke of the piston pressure and exhaust connections to the cylinder which permit of unrestricted flow of pressure fluid, thereby enabling the servopiston to travel at high speed.

In the preferred form of the invention the piston is constituted by a rotatable vane and the cylinder by a housing shaped to fit the vane, and the servomotor comprises a spindle fixed to the vane, and having axial channels communicating respectively with the portions of the housing on opposite sides of the vane, a sleeve valve surrounding the spindle and formed with pressure and exhaust ports arranged to be brought selectively into register with the channels in the spindle, after preliminary slow rotation of the vane and spindle from either end position, to establish through the channels said unrestricted pressure and exhaust connections for moving the vane at high speed.

Some alternative embodiments of the invention as applied to a servomotor for changing the gear ratio of a blower fitted to an aircraft engine, will now be described in detail, by way of example, with reference to the accompanying drawings, in which.

Figure 5:
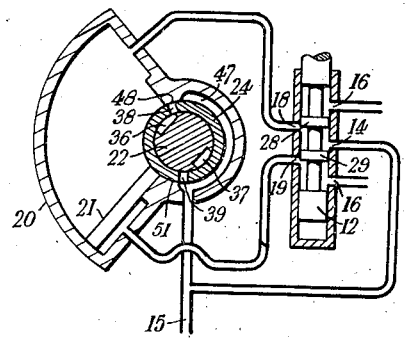
Figure 2:
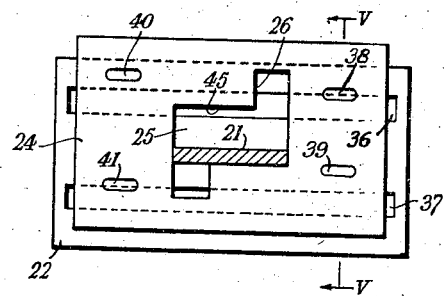
Figs. 2–4 are developments of the sleeve valve and vane spindle, showing successive positions occupied by the parts on operation of the servomotor to change the gear ratio from low altitude or M gear moderate superchange to high altitude or S gear full superchange.
Figure 3:
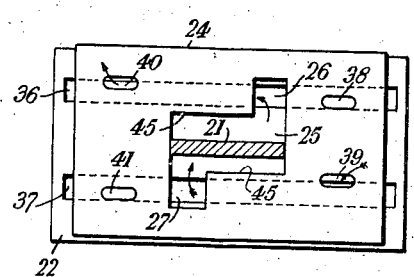
Figure 6:
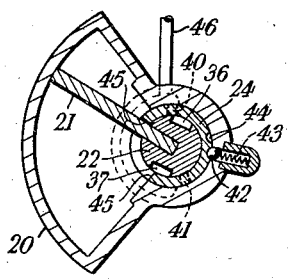
Figure 4:
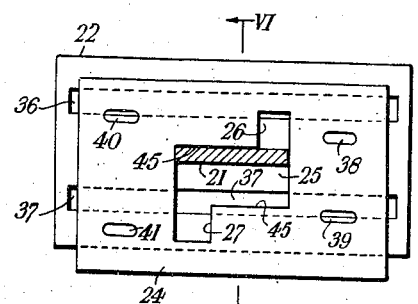
Figure 7:
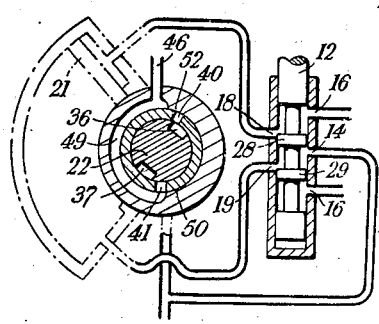
Figure 8:
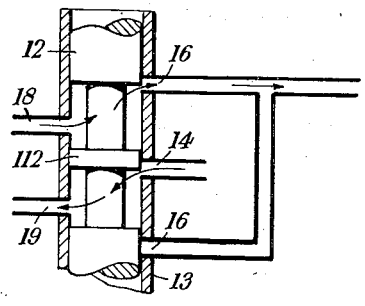
Figure 9:
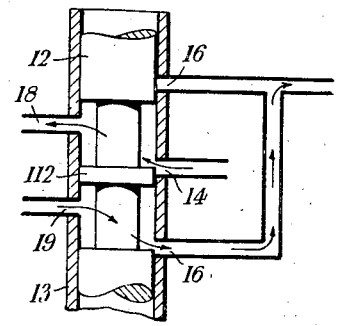
Figure 10:
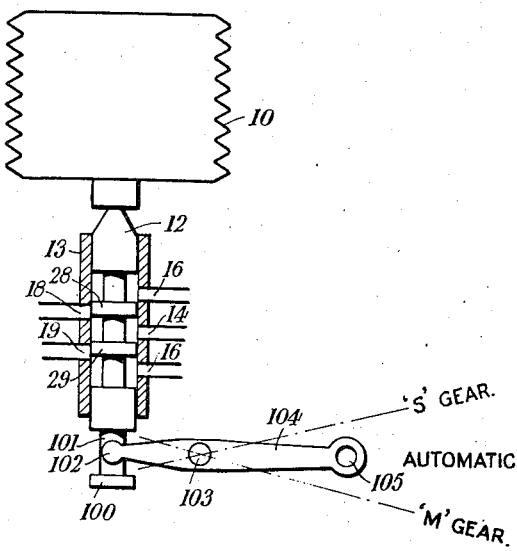

Figs. 5 and 6 are sections taken respectively on the lines V—V in Fig. 2 and VI—VI in Fig. 4, Fig. 7 is a view similar to Fig. 5 but taken through the exhaust ports of the sleeve valve instead of the pressure ports and showing the parts in the position they occupy with the blower in S gear, Figs. 8 and 9 are views, corresponding respectively to Figs. 5 and 7, showing a modification in which a single land operating valve is used in place of a two land valve, and Fig. 10 shows an alternative form of override mechanism suitable for operation in flight.

Like reference characters indicate like parts throughout the figures.

The apparatus (see Figs. 1–7) alters the gear ratio of the blower according to altitude and selected boost pressure, and is actuated by a capsule stack 10 located in a chamber 11 communicating with the atmosphere through a vent 92. To the lower end of the capsule stack is fixed a piston valve 12. This moves in a sleeve 13 as the capsule stack expands or contracts with changes in altitude.

Figure 1:
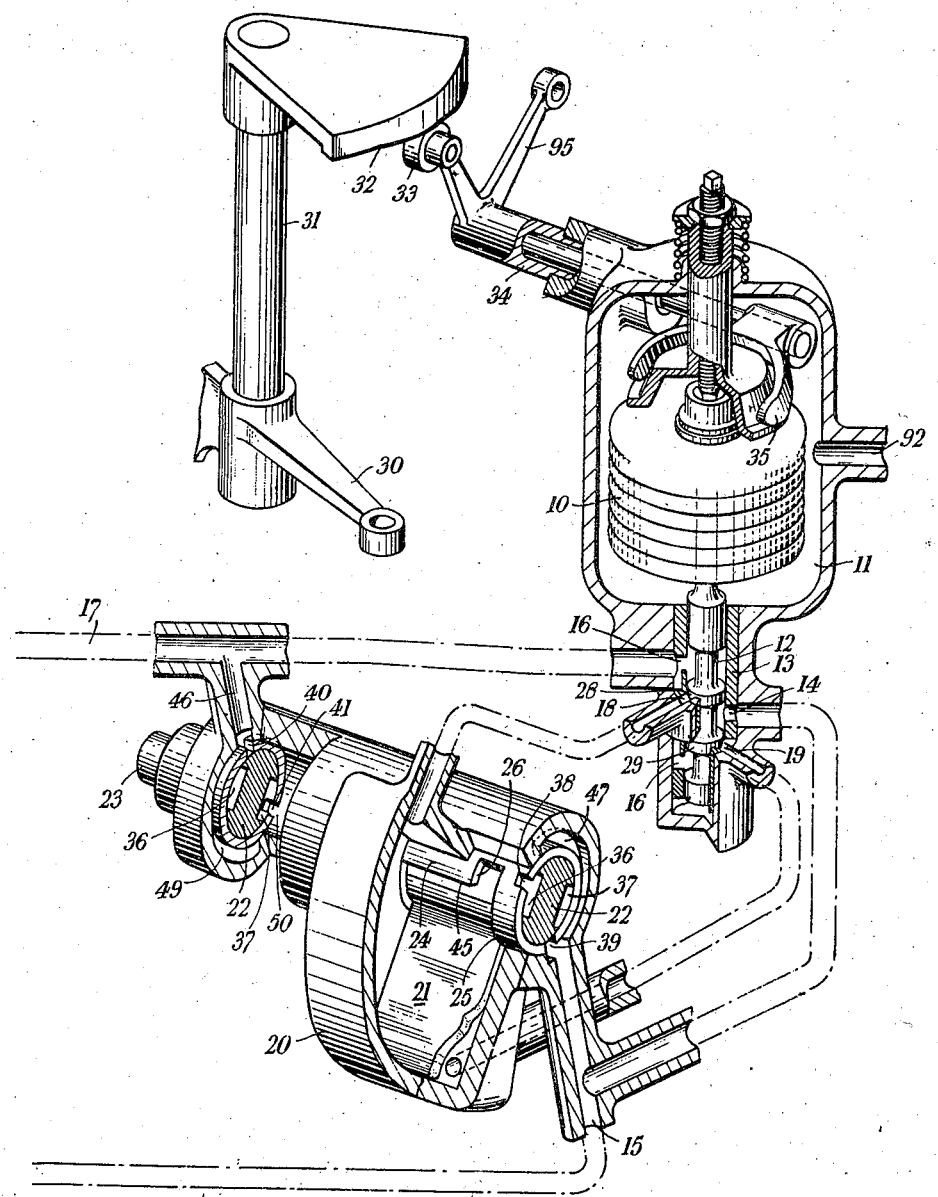
Fig. 1 is a perspective view of the first form of apparatus, partly in section.

In the sleeve 13 is a port 14 communicating with an oil pressure inlet 15 and a pair of ports 16 communicating with an exhaust outlet 17 (Fig. 1). There are also two further ports 18, 19 communicating respectively with opposite ends of a housing 20 in which is mounted a servo vane 21. The vane 21 is fixed to a spindle 22, having an extension 23 which operates the blower gear changing mechanism. Surrounding the spindle 22 is a sleeve valve 24 formed with an aperture 25 through which the vane 21 extends. As will be seen from Fig. 2 the aperture 25 is of the same width as the vane and is formed with extension slots 26, 27 the purpose of which will be explained later. The depth of the slot is less than the amplitude of movement of the vane.

At low altitudes the piston valve 12 occupies the position shown in Fig. 5 in which a restricted flow of pressure liquid is allowed through the port 18, partially masked by the upper land 28 of the valve, to the upper end of the housing 20, the lower end of the housing being connected to exhaust via port 19 (partially masked by the lower land 29 of the valve) and port 16. Under these conditions the servo vane 21 is in the bottom position shown in Fig. 2, and the blower is in M gear for low altitude and moderate supercharge.

As the altitude increases and the capsule stack 10 expands, the piston valve 12 will move down until it assumes the position shown in Fig. 7. Pressure oil is then able to pass through the port 19 to the underside of the vane 21, and the upper end of the vane housing is connected to exhaust via the ports 18, 16. The vane consequently travels to the upper end of its housing to change the blower over to S gear for high altitude and full supercharge.

For a given change of altitude, which is represented by a small displacement only of the piston valve 12, only a very small amount of oil is passed from the piston valve to the vane chamber. This would cause the vane to travel very slowly from its one end position to the other, and this movement would be too slow to give satisfactory operation of the blower clutches and would also cause excessive wear. As will be later explained, however, the vane, by effecting relative movement between its spindle 22 and the sleeve 24 provides unrestricted flow of pressure oil to the vane chamber, in such a way as to give a slow initial travel of the vane, followed by rapid passage over the major part of its journey and finally a slow travel into its ends position. The piston valve 12 therefore merely selects the direction in which the vane will travel and gives it a start on its way, the vane thereafter automatically speeding up to give a quick gear change and at the same time resetting the mechanism in readiness for the reverse travel when selected.

It will be noted that the lands 28, 29 are wider than the ports 18, 19, which provide the alternative connections from pressure and exhaust to the opposite ends of the vane housing, the lands being of sufficient width to provide a lag in the operation of the change speed gear, represented as so many feet of altitude on either side of the nominal change speed height. This is necessary to prevent the control from hunting when the aircraft is flying at about the norminal change speed height.

As an alternative to using a piston valve of the two-land type, as illustrated in Figs. 1-7, a valve having a single land can be used as shown in Figs. 8-9. The porting of the sleeve 13 is exactly the same but the land 112 controls the flow of pressure fluid from port 14. The two ports 18 and 19, the connections of which to the vane housing are in this case reversed as compared with Figs. 5 and 7, port 19 leading to the top of the housing and port 18 to the bottom of the housing, are not obstructed at all, and the two exhaust ports 16 are alternately opened and shut by the body of the piston valve as shown. Thus in Fig. 8 the valve 12 is in the up position, corresponding to M gear, and pressure is directed to the upper side of the vane through port 19, while in Fig. 9 the valve 12 is in the down position corresponding to S gear, and pressure is directed to the underside of the vane through port 18. The single land 112 and the width of the annular gaps each side of it, will of course be suitably dimensioned to provide the desired lag in operation of the change speed gear.

The altitude at which the gear ratio is altered is varied in accordance with the selected boost as follows. The pilot's lever (not shown) by which the boost is selected is coupled to an arm 30 fixed to a vertically rotatable shaft 31 carrying a cam 32. This cooperates with a follower 33 supported on a sleeve 34 carrying a claw 35 which presses against the upper end of the capsule stack. When another boost pressure is selected, the shaft 31 is rotated, thus causing the cam 32 to rotate the sleeve 34, and so vary the datum of the capsule stack 10 and therefore the altitude at which the blower gear ratio will be changed to maintain the particular boost pressure selected.

A manual override lever 95 is provided, by which the datum of the capsule stack 10 can be altered to obtain S ratio on the ground, if so desired for checking purposes.

If required the manual override linkage may be re-arranged to permit the selection of "M" or "S" gear when in flight. One method of achieving this is illustrated in Fig. 10. The lever 95 is in this case removed from sleeve 34 leaving the variable datum system otherwise unaltered. This is not shown in Fig. 10 being identical with that of Fig. 1 apart from the removal of the lever 95. The piston valve 12 is provided with an extension 100. An override lever 104 is pivoted at some suitable fixed point 103, one end 102 of the lever being located in a gap 101 in the extension 100 of the valve, and the other end 105 being connected to a lever (not shown) in the cockpit. The gap 101 is wider than the lever end 102 thus allowing free movement of valve 12 when lever 104 is in the automatic position. If the lever end 105 is placed in either "M" or "S" gear position, the end 102 will contact the appropriate face of valve extension 100, thus moving the valve up or down. This will set the blower gear change mechanism in motion as already described.

One reason for overriding the blower gear change mechanism in flight, is to prevent a gear change occurring when taking off from an aerodrome at an altitude corresponding to any particular gear change height.

The automatic speed-up mechanism for the vane will now be described with reference to Figs. 2-7. The spindle 22 is formed with two axial channels 36, 37 which are permanently in communication with the upper and lower portions of the vane housing respectively through the agency of the extension slots 26, 27. The sleeve valve has a pair of pressure ports 38, 39 and a pair of exhaust ports 40, 41. It is movable under the control of the vane between two alternative end positions, in which it is held by engagement of a ball 42, pressed by a spring 43, with one or other of two notches 44 (see Fig. 6). The movement of the sleeve valve is effected, shortly before the vane reaches the end of its stroke, by engagement of the vane with one or other of the end faces 45 of the aperture 25. Thus in Figs. 4 and 6 the vane is shown near the end of its movement into position to select S gear, and is abutting against the upper end face 45 of the aperture. On completing its journey, the vane moves the sleeve valve from the position shown in Fig. 6 to that shown in Fig. 7, the ball 42 then engaging the upper notch 44 to hold the sleeve valve in this alternative position.

Starting from the position of Figs. 2 and 5, when the piston valve 12 has been depressed sufficiently to reverse the pressure and exhaust connections to the vane housing, a restricted flow of pressure oil is provided through the port 19 to the undersurface of the vane, and the upper portion of the housing is connected to exhaust through the ports 18 and 16. The vane therefore starts to travel slowly towards the up position.

Under these conditions the sleeve valve 24 has its pressure port 39 in communication with the pressure inlet 15 via a duct 47, while the pressure port 38 is closed by the portion 48 of the casing in which the sleeve valve revolves, as shown in Fig. 5. Also (see Fig. 1) the exhaust port 40 is open to exhaust via ducts 46, 49 and the exhaust port 41 is closed by the portion 50 of the casing. When the vane has moved sufficiently to bring the channel 37 in the spindle 22 into register with the port 39 (see Fig. 3) an unrestricted flow of pressure oil is provided to the undersurface of the vane, via the port 39, channel 37 and extension slot 27. At the same time this initial movement of the vane has brought the channel 36 in the spindle into register with the exhaust port 40 (see Fig. 3) and there is unrestricted flow of oil from the upper side of the vane to exhaust through the extension slot 26, channel 36, port 40 and ducts 49, 46. The vane therefore begins to travel rapidly until it reaches the position shown in Figs. 4 and 6, that is, with the vane in contact with the upper face 45 and with the channels 36 and 37 still in register with their respective ports 40 and 39. The vane and sleeve valve 24 now move as one part, thus masking pressure port 39 with the portion of casing at 51, (see Fig. 5), and opening port 38 to duct 47. At the same time the vane has carried the exhaust port 40 in sleeve 24, out of register with duct 49 (Fig. 7), causing it to be masked by the portion of casing at 52, and has opened the exhaust port 41 to duct 49. It will be understood that although the pressure port 38 and exhaust port 41 have been registered with ducts 47 and 49 respectively, there will be no flow of fluid through them as the ports 38 and 41 are closed on their inner sides by the body of spindle 22 (see Fig. 4). The mechanism has now re-set itself to travel in the reverse direction when selected by the valve 12 to do so. The vane 21, spindle 22 and sleeve valve 24, however, continue to move in the same direction to contact a fixed stop formed by the end of housing 29, this extra movement being necessary to provide an adequate seal between the various ports. It is during this extra movement that the vane moves slowly under the influence of a restricted flow of fluid from the valve 12.

When the piston valve 12 operates again to reverse the pressure and exhaust connections to the vane, the latter will begin to rotate slowly in the anticlockwise direction until the channels 36, 37 are brought respectively into register with the open pressure port 38 and the open exhaust port 41. The vane will then speed up, and move fast until the recesses come out of register with their respective ports, whereupon the vane will slow up again and finally return the sleeve valve 24 to the position shown in Fig. 5.

It will be understood however that the hydraulic servomotor according to the invention has many other useful applications besides its use for changing the gear ratio of the blower. The amplitude of the slow starting and finishing movements can of course be adjusted by a suitable selection of the size and location of the ports in the sleeve valve.

The illustrated vane-type servomotor with rotary shuttle valve has the advantage over the known piston-type motor with piston-type shuttle valve that a large amplitude of angular movement of the vane is obtainable without the need of fitting additional parts. The angular movement of the vane, as opposed to the rectilinear movement of the piston-type servomotor, is a considerable advantage from the point of view of installation, particularly in the case of aero engine control units.

What I claim as my invention and desire to secure by Letters Patent is:

1. An hydraulic servomotor comprising a servopiston, a cylinder housing said servopiston, an operating valve for effecting movement of the servopiston to either of two alternative end positions in its cylinder, a pressure-sensitive device for actuating said operating valve, a pair of conduits communicating with opposite ends of the cylinder and providing restricted flow connections to pressure and exhaust which are reversible by said operating valve, and means, controlled by the servopiston and arranged to be operated thereby after initial slow movement thereof in either direction under the influence of said restricted flow, for establishing during at least a portion of the remainder of the stroke of said piston pressure and exhaust connections to the cylinder which permit of unrestricted flow of pressure fluid.

2. An hydraulic servomotor, comprising a piston constituted by a rotatable vane, a housing surrounding and shaped to fit the vane, an operating valve for effecting movement of the vane to either of two alternative end positions in its housing, a pressure-sensitive device for actuating said operating valve, a pair of conduits communicating respectively with opposite ends of said housing and providing restricted flow connections to pressure and exhaust which are reversible by said operating valve, a spindle fixed to the vane and having axial channels communicating respectively with the portions of the housing on opposite sides of the vane, and a sleeve valve surrounding the spindle and formed with pressure and exhaust ports arranged to be brought selectively into register with the channels in the spindle, after preliminary slow rotation of the vane and spindle from either end position, to establish through the channels said unrestricted pressure and exhaust connections for moving the vane at high speed.

3. An hydraulic servomotor as claimed in claim 2, in which the sleeve valve is arranged to be rotated by the vane, when the latter approaches the end of its stroke in either direction, between alternative positions, in which alternative pairs of pressure and exhaust ports in the sleeve cooperate with the channels in the spindle to direct the unrestricted flow of pressure fluid to the appropriate side of the vane.

4. An hydraulic servomotor as claimed in claim 2, in which the sleeve valve is arranged to be rotated by the vane, when the latter approaches the end of its stroke in either direction, between alternative positions, in which alternative pairs of pressure and exhaust ports in the sleeve cooperate with the channels in the spindle to direct the unrestricted flow of pressure fluid to the appropriate side of the vane and in which said sleeve valve is formed with an aperture through which the vane projects, the aperture being of the same width as the vane but of depth less than the stroke of the vane, said aperture being formed at its ends with extension slots each affording communication with one of the channels in the spindle in all positions of the sleeve valve and spindle.

5. An hydraulic servomotor as claimed in claim 2, comprising a spring plunger for engaging notches in the sleeve valve to hold the latter in its alternative position.

STANLEY VICTOR MADDOX.

REFERENCES CITED

The following references are of record in the file of this patent:

UNITED STATES PATENTS

| Number | Name | Date |
|---|---|---|
| 1,842,725 | Link | Jan. 26, 1932 |
| 1,877,102 | Whitesell | Sept. 13, 1932 |
| 2,217,364 | Halford et al. | Oct. 8, 1940 |
| 2,242,374 | Schultz | May 20, 1941 |
| 2,305,070 | Butler | Dec. 15, 1942 |

FOREIGN PATENTS

| Number | Country | Date |
|---|---|---|
| 548,778 | Great Britain | Oct. 23, 1942 |